United States Patent [19]
Wolt et al.

[11] 3,875,307
[45] Apr. 1, 1975

[54] FLAVORING FOODSTUFFS WITH A MIXTURE CONTAINING 1,2 CYCLOHEXANEDIONE

[75] Inventors: John Wolt, East Orange, N.J.; Christopher Giacino, Abrahamsville, Pa.; Alton Dewitt Quinn, Calicoon; Edward J. Shuster, Brooklyn, both of N.Y.; Joaquin F. Vinals, Red Bank, N.J.

[73] Assignee: International Flavors & Fragrances Inc., New York, N.Y.

[22] Filed: May 14, 1973

[21] Appl. No.: 359,679

[52] U.S. Cl. ................. 426/65, 252/522, 131/17
[51] Int. Cl. .............................................. A23l 1/26
[58] Field of Search ............ 260/586 R; 426/65, 175

[56] References Cited
UNITED STATES PATENTS

| | | | |
|---|---|---|---|
| 2,453,619 | 11/1948 | Byrns | 260/586 R |
| 2,594,379 | 4/1952 | Barch | 46/65 |
| 3,189,654 | 6/1965 | Arthur | 260/586 R |
| 3,201,263 | 8/1965 | Humphreys | 260/586 R X |

FOREIGN PATENTS OR APPLICATIONS

| | | | |
|---|---|---|---|
| 451,462 | 8/1936 | United Kingdom | 260/586 R |

OTHER PUBLICATIONS

Pittet et al., Flavor Properties of Compounds Related to Maltol & Isomaltol, J. Agr. Food Chem., Vol. 18, No. 5, 1970, pp. 929–933.

*Primary Examiner*—Joseph M. Golian
*Attorney, Agent, or Firm*—Arthur L. Liberman, Esq.; Harold Haidt, Esq.

[57] ABSTRACT

Methods for preparing foodstuffs, flavoring compositions for foodstuffs, tobacco compositions, flavoring compositions for tobaccos, perfume compositions and ingredients for perfume compositions by including therein 1,2-cyclohexanedione and, optionally, in addition, other cyclic di-ketones such as maltol, cyclotene and 2,5-dimethyl-4-hydroxy-3(2H)-furanone to produce:

a. in food flavorings, sweet burnt powerful licorice and "cyclotene" notes;
b. in perfumes, a fruity foenugreek character; and
c. in tobaccos, a maple and spicey note and more natural sweet tobacco note or to enhance the flavor and fragrance note imparted by other cyclic di-ketones such as maltol, cyclotene, and 2,5-dimethyl-4-hydroxy-3(2H)-furanone as well as the foodstuffs flavoring compositions, tobacco compositions and perfume compositions containing 1,2-cyclohexanedione and, optionally, in addition, other cyclic di-ketones such as maltol, cyclotene and 2,5-dimethyl-4-hydroxy-3(2H)-furanone.

2 Claims, No Drawings

FLAVORING FOODSTUFFS WITH A MIXTURE CONTAINING 1,2 CYCLOHEXANEDIONE

BACKGROUND OF THE INVENTION

The present invention relates to novel methods and compositions using 1,2-cyclohexanedione and, optionally, in addition, other cyclic di-ketones such as maltol, cyclotene and 2,5-dimethyl-4-hydroxy-3(2H)-furanone to alter the flavor and/or aroma of consumable materials.

There has been considerable work performed relating to substances which can be used to impart (or enhance) flavors to (or in) various consumable materials. These substances are used to diminish natural materials, some of which may be in short supply, and to provide more uniform properties in the finished product. Sweet burnt licorice, "cyclotene" flavors and "finochio" or fennel flavors are particularly desirable for many uses in consumable articles, e.g., foodstuffs. Maple/coumarin notes are particularly desirable in tobacco. Fruity, foenugreek aromas are particularly desirable in perfume compositions.

The valuable flavor material commonly known as cyclotene, or methyl cyclopentenolone (3-methylcyclopentan-1,2-dione) having the structure:

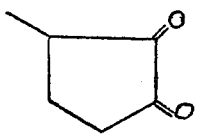

is described by Arctander in "Perfume and Flavor Chemicals" as having a "sweet and very powerful, caramellic-spicy odor ...walnut-maple-licorice-celery-tobacco...particularly when studied in the undiluted state...the taste is intensely sweet, warm, slightly spicy, root-like, walnut-celery-like with licorice-root and maplesugar as the most common words of description...is used sparingly in perfume compositions often in combination with coumarin or coumarin derivatives. It is an excellent fortifier for such materials in lavender fragrances, new mown hay, "tabac" type fragrances, spicy bases,...falls naturally into celery seed oil, lovage, fenugreek, tonka, liatris, flouve..." (Reference 1987 of Arctander, Volumn II). The textbook, "Chemistry and Physiology of Flavors" by Schultz, Day and Libbey at pages 442 and 443 states that such compounds as 3-methylcyclopentan-1,2-dione; 3,4-dimethylcyclopentan-1,2-dione; 3,5-dimethylcyclopentan-1,2-dione; 3-ethylcyclopentan-1,2-dione and 3-methylcyclohexan-1,2-dione having the structure:

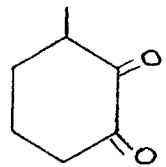

are present in the aroma of coffee. In a paper entitled "Flavor Properties of Compounds Relates to Maltol and Isomaltol" by Pittet et al. in Agricultural and Food Chemistry, Volumn 18, No. 5, page 929, September-/October 1970, the compound, 2-hydroxy-3,5-dimethyl-2-cyclohexan-1-one having the structure:

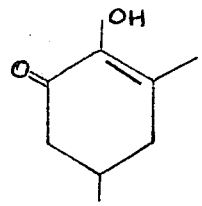

is set forth as having a charred wood, phenolic sweet note with a saffron, caramel, astringent taste. It is noteworthy that the structure of this material can also be written thus:

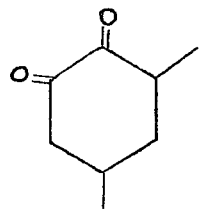

By the same token, the 1,2-cyclohexanedione which is 100% "enolized" (See "Organic Reaction Mechanisms" Breslow, W. A. Benjamin Inc., New York, 1969 at pp. 174–179) can be written thusly:

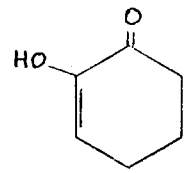

1,2-cyclohexanedione is prepared according to a process set forth in Japanese Pat. No. 2,617 issued on Feb. 19, 1966 and applied for on Mar. 29, 1963 (See Chem. Abstracts, Volumn 64, 1966, No. 14134h). In U.S. Pat. No. 3,505,327, 4-methylcyclohexane-1,2-dione was prepared as an intermediate by the Fe Cl₃ oxidation route. When 50 parts of 4-methylcyclohexanone are brominated in aqueous acetic acid and worked-up, 84 parts of 2-bromo-4-methylcyclohexanone are obtained as an oil. This oil is then hydrolyzed in water at 95°C for 10 minutes and oxidized with FeCl₃ at 95°C for 20 minutes. On workup, 59.2 parts of 4-methylcyclohexane-1,2-dione are obtained as a dark oil. Similarly, 1,2-cyclohexanedione is prepared using cyclohexanone as a starting material in place of 4-methylcyclohexane-1,2-dione, thus:

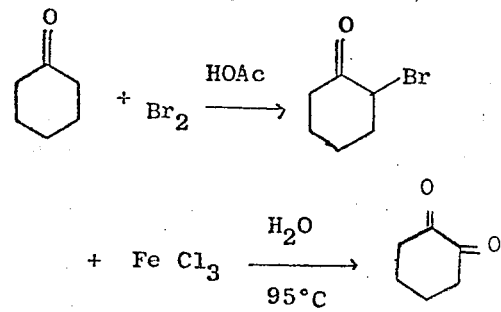

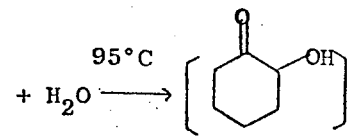

See Netherlands Pat. No. 58,279, Sept. 16, 1946.

THE INVENTION

It has now been discovered that novel solid and liquid foodstuff and flavoring compositions having sweet burnt notes reminiscent of licorice and cyclotene and which can be described as sweet caramel, and maple-like; and novel aroma imparting compositions having maple, black walnut and foenugreek character; as well as tobacco compositions having maple/coumarin notes may be provided by the utilization of 1,2-cyclohexanedione alone or in combination with such di-ketones as maltol, cyclotene, and 2,5-dimethyl-4-hydroxy-3(2H)-furanone. Thus, the 1,2-cyclohexanedione of our invention is capable of supplying and/or potentiating certain flavor and aroma notes usually lacking in many licorice-type flavors as well as walnut flavors, maple flavors, celery flavors and tobacco flavors heretofore provided. Furthermore, the 1,2-cyclohexanedione of our invention is capable of supplying certain fragrance notes usually lacking in many perfumery materials, for example, lavender fragrances, new mown hay, tabac type fragrances, spicy bases and foenugreek fragrances. The intense foenugreek character of 1,2-cyclohexanedione is unexpected in view of the relatively weaker foenugreek character of its isomers, such as cyclotene.

When the 1,2-cyclohexanedione of our invention is used as a food flavor adjuvant, the nature of the co-ingredients included with the said 1,2-cyclohexanedione in formulating the product composition will also serve to alter the organoleptic characteristics of the ultimate foodstuff treated therewith. As used herein in regard to flavors, the term "alter" in its various forms means supplying or imparting flavor character or note to otherwise bland, relatively tasteless substance or augmenting the existing flavor characteristic where a natural flavor is deficient in some regard, or supplementing the existing flavor impression to modify its quality, character or taste. As used herein, the term "foodstuff" includes both solid and liquid ingestible materials which usually do, but need not, have nutritional value. Thus, foodstuffs includes meats, gravies, soups, convenience foods, beverages, dairy products, candies, vegetables, cereals, soft drinks, snacks and the like.

Substances suitable for use herein as co-ingredients or flavoring adjuvants are well known in the art for such use being extensively described in the relevant literature. Except for the cyclic di-ketones, mentioned supra, apart from the requirement that any such material be "ingestibly" acceptable, and thus non-toxic or otherwise non-deleterious, nothing particularly critical resides in selection thereof. Accordingly, such materials which may in general be characterised as flavoring adjuvants or vehicles comprise broadly, stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, and sequestrants, e.g., citric acid.

Thickener compounds include carriers, binders, protective colloids, suspending agents, emulsifiers and the like, e.g., agaragar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g., mono-and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcuma and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like. -one, Other flavorants and flavor intensifiers include organic acids, e.g., fatty saturated acids, unsaturated acids, and amino acids; alcohols, e.g., primary and secondary alcohols; esters, carbonyl compounds including aldehydes and ketones as well as lactones; cyclic organic materials including benzene derivatives; isocyclics, heterocyclics such as furans, particularly 3-acetyl furan and 2-methyl-2,3-dihydrofuran-31one, pyridines, pyrazines (particularly monoalkyl, dialkyl, trialkyl and tetraalkyl substituted pyrazines) and the like, sulfur-containing materials including thiazoles, disulfides, thiols, sulfides, aldehydes, (for example, 3-phenyl-4-pentenal, 3-phenyl-3-pentenal, 3-phenyl-2-pentenal, 2-phenyl-2-pentenal and 2-phenyl-3-methyl-2-butenal); disulfides and the like; other flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid depending upon the desired physical form of the ultimate product, i.e., foodstuff, whether simulated or natural, and should, in any event, be capable of providing an environment in which the 1,2-cyclohexanedione can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 1,2-cyclohexanedione employed in a particular instance can vary over a relatively wide range whereby to its desired organoleptic effects having reference to the nature of the product are achieved. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of 1,2-cyclohexanedione will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 1,2-cyclohexanedione ranging from a small but effective amount, e.g., 1.0 part per million up to about 50 parts per million by weight based on total composition are suitable when used alone without other cyclic di-ketones. Further, when used with such cyclic di-ketones as maltol, cyclotene, and 2,5-dimethyl-4-hydroxy-3(2H)-furanone, the concentration of 1,2-cyclohexanedione can be as low as 0.1 part per million and the over-all concentration of the combination of 1,2-cyclohexanedione and cyclic di-ketones (such as maltol, cyclotene, and 2,5-dimethyl-4-hydroxy-3(2H)-furanone can be as low as 0.5 part per million or as high 50 part per million. Concentrations in excess of the maximum quantities stated are not normally recommended since they fail to provide commensurate enhancement of organoleptic properties. In those instances wherein the 1,2-cyclohexanedione is added to the foodstuff as an integral component of a flavoring composition, it is, of course, essential that the total quantity of flavoring composition employed be sufficient to yield an effective 1,2-cyclohexanedione concentration in the foodstuff product.

Food flavoring compositions prepared in accordance with the present invention preferably contain the 1,2-cyclohexanedione in concentrations ranging from about 1% up to about 10% by weight based on the total weight of said flavoring composition when the 1,2-cyclohexanedione is used without other cyclic di-ketones. When used with other cyclic di-ketones, such as maltol, cyclotene, and 2,5-dimethyl-4-hydroxy-3(2H)-furanone, the composition may contain as little as 0.1% 1,2-cyclohexanedione and the combination of 1,2-cyclohexanedione with other cyclic di-ketones may be as well as 0.5%.

The compositions described herein can be prepared according to conventional techniques well known as typified by cake batters, and "vegetable" juices can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 1,2-cyclohexanedione and, optionally, in addition, other cyclic di-ketones such as, maltol, cyclotene, and 2,5-dimethyl-4-hydroxy-3(2H)-furanone, with, for example, gum arabic, gum tragacanth, carrageenan and the like, and thereafter, spray drying the resultant mixture whereby to obtain the particular solid product. Pre-prepared flavor mixes in powder form, e.g., a "licorice" mix or vanilla powder or "maple sugar" flavored powder obtained by mixing the dried solid components, e.g., starch, sugar and the like and 1,2-cyclohexanedione in a dry blender until the requisite degree of uniformity is achieved.

It is presently preferred to combine with the 1,2-cyclohexanedione the following adjuvants:

Eugenol
Guaiacol
Vanillin
Sucrose
Heliotropin
Ethyl Vanillin
Maltol
Ethyl Maltol
Cyclotene
Ethyl Cyclotene
Methyl Cyclopentenolone Butyrate and
2,5-Dimethyl-4-Hydroxy-3(2H)-Furanone 1,2-Cyclohexanedione and, optionally, other cyclic di-ketones, such as maltol, cyclotene and 2,5-dimethyl-4-hydroxy-3(2H)-furanone can also be used to improve and augment the organoleptic properties of tobacco and tobacco products. Thus, the said 1,2-cyclohexanedione will impart a sweet more natural tobacco character and a maple and spicey note to a standard maple flavor used in tobacco when used at levels of 500 parts per million (with other cyclic di-ketones) up to from 1,000 to 6,000 parts per million (when used alone) based on the dry weight of the tobacco. "Tobacco," as used herein includes natural tobaccos, such as burley, Turkish tobacco, Maryland tobacco, tobacco-like products, such as reconstituted tobacco of homogenized tobacco; and tobacco substitutes intended to replace natural tobacco such as various vegetable leaves, for example, lettuce and cabbage leaves and the like.

1,2-Cyclohexanedione and an auxiliary perfume ingredient, including, for example, alcohols, aldehydes, nitriles, esters, cyclic esters, and natural essential oils, may be admixed so that the combined odors of the individual components produce a pleasant or desired fragrance. Such perfume compositions usually contain (a) the main note or the "bouquet" or foundation stone of the composition; (b) modifiers which round off and accompany the main note; (c) fixatives which includes odorous substances which lend a particular note to the perfume throughout all stages of evaporation and substances which retard evaporation; and (*d*) topnotes which are usually low boiling fresh smelling materials.

In perfume compositions the individual component will contribute its particular olfactory characteristics, but the over-all effect of the perfume composition will be the sum of the effects of each of the ingredients. Thus, 1,2-cyclohexanedione and, optionally, in addition, other cyclic di-ketones, such as maltol, cyclotene, or 2,5-dimethyl-4-hydroxy-3(2H)-furanone can be used to alter the aroma characteristics of a perfume composition, for example, by utilizing or moderating the olfactory reaction contributed by another ingredient in the composition.

The amount of the 1,2-cyclohexanedione of our invention which will be effective in perfume compositions depends in many factors, including the other ingredients, their amounts and the effects which are desired. It has been found that perfume compositions containing as little as 0.05% of 1,2-cyclohexanedione (when used without other cyclic di-ketones) or even less (e.g., 0.01% when used with other cyclic di-ketones, such as maltol, cyclotene, and 2,5-dimethyl-4-hydroxy-3(2H)-furanone) can be used to impart a scent odor to soaps, cosmetics, and other products. The amount employed can range up to 5% of the fragrance components and will depend on considerations of cost, nature of the end product, the effect desired on the finihsed product and the particular fragrance sought.

1,2-Cyclohexanedione (and, optionally, in addition, other cyclic di-ketones, such as maltol, cyclotene, and 2,5-dimethyl-4-hydroxy-3(2H)-furanone) is useful in perfume composition as an olfactory component in detergents and soaps; space odorants and deodorants; perfumes; colognes; toilet waters; bath preparations, such as bath oils and bath solids; hair preparations, such as lacquers, brilliantines, pomades and shampoo; cosmetic preparations, such as creams, deodorants, hand lotions, and sun screens; powders, such as talcs, dusting powders, face powders and the like. When used as an olfactory component of a perfumed article, as little as 100 part per million of 1,2-cyclohexanedione (either taken alone or taken further together with other cyclic di-ketones) will suffice to impart a low keyed fruity foenugreek character which is one of the key odor characteristics of such perfume formulations as Blue Grass. Generally, no more than 0.5% of 1,2-cyclohexanedione based on the ultimate end product is required in the perfume composition.

In addition, the perfume composition or fragrance composition of this invention can contain a vehicle or carrier for 1,2-cyclohexanedione. The vehicle can be a liquid such as an alcohol, a non-toxic alcohol, a non-toxic glycol, or the like. The carrier can also be an absorbent solid, such as a gum (e.g. gum arabic) or components for encapsulating the composition (such as gelatin).

It will thus be apparent that 1,2-cyclohexanedione can be utilized to alter the sensory properties, particularly organoleptic properties, such as flavor and/or fragrance of a wide variety of consumable materials.

The following examples are given to illustrate embodiments of the invention as it is presently preferred to practice it. It will be understood that these examples are illustrative, and the invention is not to be considered as restricted thereto except as indicated in the appended claims.

EXAMPLE I

PERFUME FORMULATION

The following mixture is prepared:

| Ingredients | Parts by Weight |
|---|---|
| 1,2-Cyclohexanedione | 5 |
| 2-oxa-1,1,3,3-tetramethyl-2,3,5,6,7,8-hexahydro-1H-benz(f)-indene | 100 |
| Coumarin | 70 |
| Patchouli Oil | 5 |
| Jasmone | 3 |
| Civet Tincture 10% Ethanol | 2 |
| Alpha Methyl Ionone | 10 |
| Rhodinol | 20 |
| Dimethyl Benzyl Carbinyl Acetate | 5 |
| Geranium Bourbon | 40 |
| Bergamot Oil | 50 |
| Bois de Rose | 40 |
| Eugenol | 25 |
| Ylang Extra | 40 |
| Isoeugenol | 20 |
| 4-(4-methyl, 4-hydroxy amyl)$\Delta^3$-cyclohexene carboxaldehyde | 150 |
| Jasmin Absolute | 10 |
| Vertofix Coeur (Reaction product of Acetic Anhydride and Polyphosphoric Acid with American Cedarwood Oil (Runeberg, Acta. Chem.Scand-15,592 (1961) | 100 |
| Mixture of Cis and Trans Isomers of Para Tertiary Butyl Cyclohexanyl Acetate Containing 52% of Cis Isomer and 48% of Trans Isomer | 100 |
| Benzoin | 50 |
| Amyl Salicylate | 30 |
| Benzyl Salicylate | 70 |

The 1,2-Cyclohexanedione imparts to this Blue Grass fragrance a low keyed fruity foenugreek character which is one of the key odor characteristics of this type of aroma.

EXAMPLE II

PREPARATION OF SOAP COMPOSITION

One hundred grams of soap chips are mixed with one gram of the perfume composition of Example I until a substantially homogeneous composition is obtained. The perfumed soap composition exhibits the Blue Grass fragrance of which the foenugreek, fruity odor is a necessary part.

EXAMPLE III

PREPARATION OF A DETERGENT COMPOSITION

A total of 100 grams of a detergent powder is mixed with 0.15 grams of perfume composition of Example I until a substantially homogeneous composition is obtained. This composition exhibits the Blue Grass fragrance which the foenugreek, fruity odor is a necessary part.

EXAMPLE IV

PREPARATION OF A COSMETIC POWDER COMPOSITION

A cosmetic powder is prepared by mixing in a ball mill 100 grams of talcum powder with 0.25 grams of 1,2-cyclohexanedione. It has an excellent foenugreek aroma.

EXAMPLE V

PERFUMED LIQUID DETERGENT

Concentrated liquid detergents with a rich foenugreek character are prepared containing 0.10%, 0.15%, and 0.20% of 1,2-cyclohexanedione. They are prepared by adding and homogeneously mixing the appropriate quantity of 1,2-cyclohexanedione in the liquid detergent. The detergents all possess a foenugreek and fruity fragrance, the intensity increasing with greater concentration of 1,2-cyclohexanedione.

EXAMPLE VI 1,2-Cyclohexanedione is incorporated in a cologne at a concentration of 2.5% in 85% aqueous ethanol; and into a handkerchief perfume at a concentration of 5% (in 95% aqueous ethanol). A distinct and definite strong foenugreek, fruity fragrance is imparted to the cologne and to the handkerchief perfume.

EXAMPLE VII

The composition of Example I is incorporated in a cologne at a concentration of 2.5% in 85% aqueous ethanol; and into a handkerchief perfume at a concentration of 20% (in 95% aqueous ethanol). The composition of Example I affords a distinct and definite strong Blue Grass fragrance to the handkerchief perfume and cologne of which the foenugreek, fruity odor, supplied by the 1,2-cyclohexanedione, is a necessary part.

EXAMPLE VIII

TOBACCO FLAVORING FORMULATION

A tobacco flavoring formulation is prepared by admixing the following ingredients:

| Ingredients | Parts by Weight |
| --- | --- |
| Ethyl Butyrate | 0.05 |
| Ethyl Valerate | 0.05 |
| Maltol | 2.00 |
| Cocoa Extract | 26.00 |
| Coffee Extract | 10.00 |
| Ethanol | 20.00 |
| Water | 41.90 |

The above formulation is added to smoking tobacco (bright, burley, turkish, homogenized tobacco) at the rate of 1–3% by weight of the tobacco. The tobacco is then formulated into cigarettes by the usual manufacturing procedures:

i. At the rate of 1,000 part per million, to each cigarette, is added 1,2-cyclohexanedione. The use of the 1,2-cyclohexanedione enhances the natural tobacco character causing the tobacco to have a sweeter taste and aroma on smoking.

ii. At the rate of 6,000 part per million, to each cigarette, is added 1,2-cyclohexanedione. The use of the 1,2-cyclohexanedione causes the tobacco to have a distinct and natural maple and spicey note prior to smoking and on smoking.

iii. At the rate of 500 part per million of 1,2-cyclohexanedione and 500 part per million of cyclotene, a 50–50 (weight-weight) mixture of 1,2-cyclohexanedione and cyclotene is added to each cigarette. The use of this mixture enhances the natural tobacco character causing the tobacco to have a sweeter taste and aroma on smoking. The effect of using this mixture of 1,2-cyclohexanedione and cyclotene is considered to be synergistic.

EXAMPLE IX

FLAVOR FORMULATIONS

The following mixture is prepared:

| Ingredients | Parts by Weight |
| --- | --- |
| 1,2-Cyclohexanedione | 1.00 |
| Hickory Smoke Flavor, Natural | 0.30 |
| Eugenol | 0.05 |
| Maple Sugar | 98.00 |
| Guaiacol | 0.05 |
| Vanillin | 0.60 |

The addition of the 1,2-cyclohexanedione imparts to this flavor a sweet burnt licorice aroma having a surprisingly intense foenugreek-like aroma.

EXAMPLE X

VANILLA FLAVOR POWDER

The following formulation is prepared:

| Ingredients | Parts by Weight |
| --- | --- |
| Vanillin | 5.00 |
| Ethyl Vanillin | 1.00 |
| Sucrose | 73.00 |
| Starch | 20.80 |
| Heliotropine | 0.10 |
| 1,2-Cyclohexanedione | 0.10 |

The use of the 1,2-cyclohexanedione imparts to the vanilla flavor powder an excellent burnt sugar maple-like sweet caramel aroma and taste.

What is claimed is:

1. A process for altering the flavor properties of a foodstuff which comprises adding thereto in an amount of from 0.5 ppm up to 50 ppm, a composition comprising 1,2-cyclohexanedione and a second cyclic diketone selected from the group consisting of ethyl maltol, ethyl cyclotene, methyl cyclopentenolone butyrate, maltol, cyclotene and 2,5-dimethyl-4-hydroxy-3 (2H)-furanone, the amount of 1,2 cyclohexanedione in said foodstuff being in a concentration of at least 0.1 ppm.

2. The process of claim 1 wherein there is additionally added to said foodstuff a flavor adjuvant selected from the group consisting of eugenol, guaiacol, vanillin, sucrose, heliotropin and ethyl vanillin.

* * * * *